United States Patent [19]

Erckert

[11] Patent Number: 5,656,910
[45] Date of Patent: Aug. 12, 1997

[54] DRIVER CIRCUIT FOR A STEPPING MOTOR

[75] Inventor: Ricardo Erckert, Bad Aibling, Germany

[73] Assignee: SGS-Thomson Microelectronics GmbH, Grasbrunn, Germany

[21] Appl. No.: 491,925

[22] PCT Filed: Nov. 18, 1994

[86] PCT No.: PCT/EP94/03822

§ 371 Date: Aug. 28, 1995

§ 102(e) Date: Aug. 28, 1995

[87] PCT Pub. No.: WO95/14327

PCT Pub. Date: May 26, 1995

[30] Foreign Application Priority Data

Nov. 19, 1993 [DE] Germany ................ 43 39 553.8

[51] Int. Cl.⁶ .................. H02P 8/00; H02P 8/12; H02P 8/36

[52] U.S. Cl. .................. 318/685; 318/138; 318/254; 318/293

[58] Field of Search ................ 318/138, 245, 318/254, 280–299, 430, 434, 685, 560–696; 363/40, 41, 42, 43

[56] References Cited

U.S. PATENT DOCUMENTS

| | | | |
|---|---|---|---|
| 4,167,693 | 9/1979 | Liska et al. | 318/138 |
| 4,562,387 | 12/1985 | Lehnhoff | 318/285 |
| 4,568,867 | 2/1986 | Remus et al. | 318/696 |
| 4,626,760 | 12/1986 | Bui et al. | 318/696 |
| 4,675,590 | 6/1987 | Pellegrino et al. | 318/696 |
| 4,682,092 | 7/1987 | Pellegrino et al. | 318/696 |
| 4,710,686 | 12/1987 | Guzik | 318/293 |
| 4,780,651 | 10/1988 | Nakano et al. | 318/254 |
| 4,818,924 | 4/1989 | Burney | 318/561 |
| 4,845,417 | 7/1989 | Ohkubo et al. | 319/696 |
| 4,862,051 | 8/1989 | Moteki | 318/696 |
| 4,985,666 | 1/1991 | Nakabayashi | 318/434 |
| 5,032,780 | 7/1991 | Hopkins | 318/696 |
| 5,144,209 | 9/1992 | Ingji et al. | 318/254 |
| 5,163,172 | 11/1992 | Hakala | 318/762 |
| 5,164,649 | 11/1992 | Sarbach et al. | 318/685 |
| 5,182,499 | 1/1993 | Inaji et al. | 318/254 |
| 5,237,254 | 8/1993 | Guerin | 318/685 |
| 5,319,291 | 6/1994 | Remirez | 318/254 |
| 5,530,332 | 6/1996 | Rees | 318/685 |

FOREIGN PATENT DOCUMENTS

| | | | |
|---|---|---|---|
| 0 083 841 A1 | 7/1983 | European Pat. Off. | H02P 8/00 |
| 0 311 095 A2 | 4/1989 | European Pat. Off. | H02P 8/00 |
| 0 394 941 A2 | 10/1990 | European Pat. Off. | H02P 8/00 |
| 29 44 355 A1 | 6/1980 | Germany | H02P 8/00 |
| 36 10 253 C2 | 3/1989 | Germany | H02P 6/00 |
| 39 14 287 A1 | 11/1990 | Germany | H02M 3/156 |
| 41 15 734 A1 | 11/1991 | Germany | H02M 1/12 |
| 63-202263 | 8/1988 | Japan | H02M 1/12 |

OTHER PUBLICATIONS

SGS–Thomson data sheet PBL3717A, pp. 643–652.
Motorola data sheet MC33192, Motorola Inc. Rev. 2.0 Mar. 92, pp. 1–9.

*Primary Examiner*—Paul Ip
*Attorney, Agent, or Firm*—David V. Carlson; Seed and Berry LLP

[57] ABSTRACT

A driver circuit for an electronically commutated electric motor, in particular stepping motor, having one full bridge circuit (I, II) per motor winding (L1, L2), a current sensor resistor (R), a measured value storage device (C5) and a regulator circuit (OP1–OP5) for regulating, during part of the driver phases, the total current flowing through the driver circuit in such a way that this current matches a total current value flowing outside the regulating phases and stored in the storage circuit (C5), in order to prevent alternating components in the total current fed via the supply voltage lines.

36 Claims, 3 Drawing Sheets

FIG.1

DRIVER CIRCUIT FOR A STEPPING MOTOR

This invention relates to a driver circuit according to the preamble of claim 1. Such a driver circuit is known from EP 0 394 941 A2.

TECHNICAL FIELD

One embodiment of the invention relates to a driver circuit for a two-phase stepping motor having two motor windings each of which is supplied by a full bridge circuit, each full bridge circuit having a parallel connection, connected between the two poles of a power supply source, with two series-connected controllable driver elements in each case, and the corresponding motor winding being connected between the connection-point between the two driver elements of one series connection and the connection point of the two driver elements of the other series connection, and having a control logic circuit which is coupled on the output side with control inputs of the individual controllable driver elements and drives them to release winding current pulses for a half-step mode of the stepping motor in such a way that alternatingly only one motor winding, only the other motor winding or both motor windings are energized, or drives the control inputs of the individual controllable driver elements to release bipolar winding current pulses for a full-step mode of the stepping motor.

Such a driver circuit can also be controlled for full-step mode.

BACKGROUND OF THE INVENTION

Figure 2:
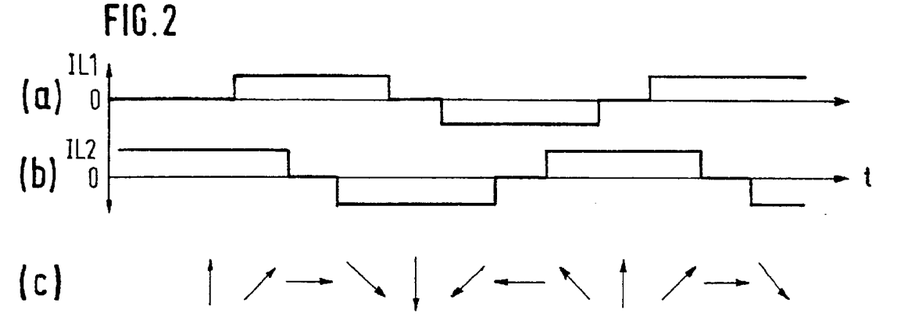
FIG. 2 shows a half-step mode of the conventional type, FIGS. 2(a) and 2(b) showing control sequences for the two windings of a two-phase stepping motor, and FIG. 2(c) showing schematically the successive armature positions of the stepping motor in half-step mode.

A stepping motor is controlled by alternatingly energizing its windings. In the type known from EP 0 394 941 A2 FIG. 2 shows a typical control sequence for the half-step mode preferred for its quiet running for a two-phase stepping motor with two windings. FIG. 2(a) shows bipolar current pulse sequence IL1 for one winding. FIG. 2(b) shows bipolar current pulse sequence IL2 for the other winding. The armature position of the stepping motor resulting from this control sequence for half-step mode is indicated in FIG. 2(c).

The periodic change-over of the pulsed winding currents causes electromagnetic interference to occur both over the motor leads connected with a motor driver and over the supply voltage lines. These lines thereby act as antennas. By making the leads from the driver to the motor very short one can practically eliminate their antenna effect. However the supply voltage lines are relatively long and form very good antennas.

The driver circuit known from EP 0 394 941 A2 performs current regulation even during maximum current flow. This leads to a corresponding voltage drop on a regulating transistor. The consequence is a high power loss.

From DE 29 44 335 A1 it is known to supply the windings of a stepping motor with current pulses which are not digital but have a staircase form with four amplitude values. This makes it possible to increase the step number per revolution of the stepping motor. The resulting total current contains stages which lead to interference.

The driver circuit known from DE 29 44 335 A1 works in principle like the driver circuit in EP 0 394 941 A2 but uses a clocked regulation with pulse width modulation. Although this reduces losses, it increases the interference.

Known stepping motors include so-called chopping or clocked stepping motor drivers e.g. as in DE 29 44 335 A1, which subject the windings of the stepping motor to a series of pulses during each energizing phase, and non-chopping stepping motor drivers (e.g. as in EP 0 394 941 A2), which subject the individual windings to only one current pulse during each energizing phase.

With chopping stepping motor drivers, current regulation is effected by pulse width modulation of the voltage across the particular motor winding energized. With the switching frequencies of a few 10 kHz usual today, considerable electromagnetic interference occurs unless suitable blocking measures are taken. A relevant part of the total design effort and financial expense for a stepping motor system with such current regulation is required for these blocking measures. A typical integrated stepping motor driver with chopping current regulation is PBL 3717 from SGS-Thomson, shown in the corresponding data sheet.

Figure 3:
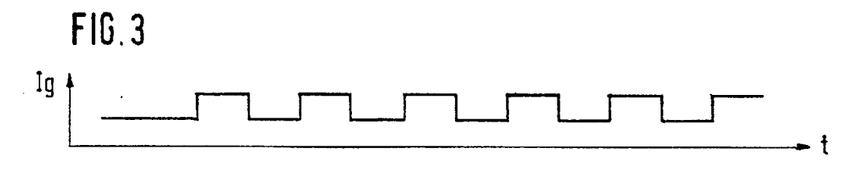
FIG. 3 shows the current consumption of conventional driver circuits for half-step mode.

With non-chopping stepping motor drivers, current adjustment is effected via the ohmic resistance of each motor winding. The chopper disturbances due to the high switching frequencies mentioned in connection with chopping stepping motor drivers do not exist in chopping stepping motor drivers. However the current pulses, as are shown in FIGS. 2(a) and 2(b), still cause interference in the case of steep pulse edges. Interference over the leads from the stepping motor driver to the motor windings can be very greatly reduced, as already mentioned, by keeping the leads from the stepping motor driver to the motor windings very short so that these leads no longer act as antennas. However, total current Ig which the system comprising stepping motor and stepping motor driver draws from the supply voltage source via supply voltage lines still contains a large alternating component with four times the frequency of the drive sequence. This is shown in FIG. 3. At the times when both motor windings are energized the current consumption of the system is twice as high as at the times when only one motor winding is energized. This has the effect of pulses being superimposed on the low current consumption value. This leads to interference over the supply voltage lines.

In some applications one attempts to reduce the interference over the motor leads and supply voltage lines by providing accordingly slow switching edges of the stepping motor driver. This eases the problem of interference but does not fundamentally eliminate it.

An example of this technology is the integrated stepping motor driver MC 33192 from Motorola, shown in the corresponding data sheet.

Operating one of the two driver elements in each bridge arm, i.e. each driver element series connection, of a bridge circuit as a controllable switch and the other driver element as a controllable amplifier element is known in the art from the abovementioned prints EP 0 394 941 A2 and DE 29 44 355 A1.

In EP 0 394 941 A2 this measure serves to compensate winding unevenness which would lead to step errors of the stepping motor if not compensated. To overcome this, one of the two driver elements is formed by the transistor of a current mirror via which the constant current from a constant current source is impressed on this driver element when the latter is rendered conductive along with a switching transistor of the other bridge arm of the full bridge.

In DE 29 44 335 A1, as already mentioned, a subdivision of the step size and thus an increase in step number per revolution is effected by staircase pulses. For this purpose one driver element of each bridge arm is formed by a controllable transistor which is switched on and off with the help of a flip-flop and is fed in the on state, via the output of a comparator whose one input is fed the output signal from a current sensor resistor measuring the winding current and whose other input is fed a reference voltage of variable voltage determined by a constant-value storage, a control voltage which leads to a winding current with an instantaneous stage value corresponding to the storage value released instantaneously by the constant-value storage.

EP 0 083 841 A1 discloses stepping motor control means for operating a stepping motor either in step mode or in linear mode. Each of two motor windings has associated therewith a full bridge circuit with two bridge arms each having two switching transistors in series connection. Associated with each winding is a current sensor resistor whose voltage can be divided down to one of several possible component voltages by means of a voltage divider in accordance with the readout value of a constant-value storage. This component voltage is compared in a comparator with a reference voltage coming from a triangle generator. Using phase driver circuits which are fed an output value from the constant-value storage on the one hand and the output signal from the comparator on the other hand, one can drive the switching transistors of the full bridge circuit to conduct winding currents of different current step heights. In linear mode of the stepping motor this stepped drive of the switching transistors is to lead to a constant total current through the two motor windings. However, since no regulation is involved here it is not ensured that a constant total current is actually reached under all operating conditions.

From DE 36 10 253 C2 it is known in the art to provide an edge steepness reducing circuit for reducing the steepness of the driver control pulses in connection with a control circuit for a DC motor with no commutator.

SUMMARY OF THE INVENTION

The problem on which the invention is based is to provide a stepping motor driver which avoids high-frequency components on the supply voltage lines.

For a half-step mode the inventive solution consists in operating one of the two driver elements in each series connection of the driver circuit stated at the outset as a controllable switch and the other driver element as a controllable amplifier element, providing a current sensor device for detecting the total winding current flowing through the particular motor winding(s) energized, providing a storage device for storing the particular winding current value detected by the current sensor device during energizing of only one of the motor windings, and providing a regulator circuit for regulating the total bridge current flowing through the two full bridge circuits during energizing of both motor windings via the controllable amplifier elements to the value of the winding current value stored at the preceding energizing of only one of the motor windings.

In the full-step mode the inventive solution with the driver circuit stated at the outset consists in operating one of the two driver elements in each series connection as a controllable switch and the other driver element as a controllable amplifier element, providing an edge steepness reducing circuit for slanting the pulse edges of the current pulses fed to the motor windings to a predetermined edge slope, having the control logic circuit drive the control inputs of the individual driver elements such that the polarity reversals of the current pulses of one motor winding are phase-shifted by 90° over the polarity reversals of the current pulses of the other motor winding, providing a current sensor device for detecting the total winding current flowing through the particular motor winding(s) energized, providing a storage device for storing the particular total winding current value detected by the current sensor device during maximum energizing of both motor windings, and providing a regulator circuit for regulating, during an edge slope of one of the two winding current pulses, the total bridge current flowing through both full bridge circuits via the controllable amplifier elements to the value of the winding current value stored at the preceding maximum energizing of both motor windings.

The abovementioned 90° phase shift presupposes a symmetrically wound motor and true running of the motor. If running is untrue and/or the motor is asymmetrically wound, phase shifts deviating from 90° are possible.

The success of the inventive solutions is that there is constant current consumption over the supply voltage lines both in half-step mode and in full-step mode, eliminating the alternating components leading to interference on the supply voltage lines. Although the supply voltage lines can still act as antennas, there is no longer interference over them.

The edge steepness reduction in the full-step mode can be already produced in the control logic circuit and imposed on the stepping motor driver. Alternatively, however, the edge steepness reduction can be only performed in the stepping motor driver.

Edge steepness reduction can also be effected in half-step mode in order to avoid interference over motor leads which for some reason cannot be made so short that they no longer act as antennas.

One can use one and the same driver circuit for both full-step mode and half-step mode. For these two modes the control logic circuit must provide different drive signals. Whether full-step mode or half-step mode exists can be detected in the control logic circuit directly from the drive signals. Full-step mode is characterized by the full bridges passing directly from conductive in a first direction to conductive in an opposed second direction, or from conductive in the second direction to conductive in the first direction. In half-step mode the the particular full bridge reversed passes from nonconductive to conductive.

BRIEF DESCRIPTION OF THE DRAWINGS

The invention will now be explained more closely with reference to a preferred embodiment. In the drawings.

DETAILED DESCRIPTION OF THE INVENTION

Figure 1:
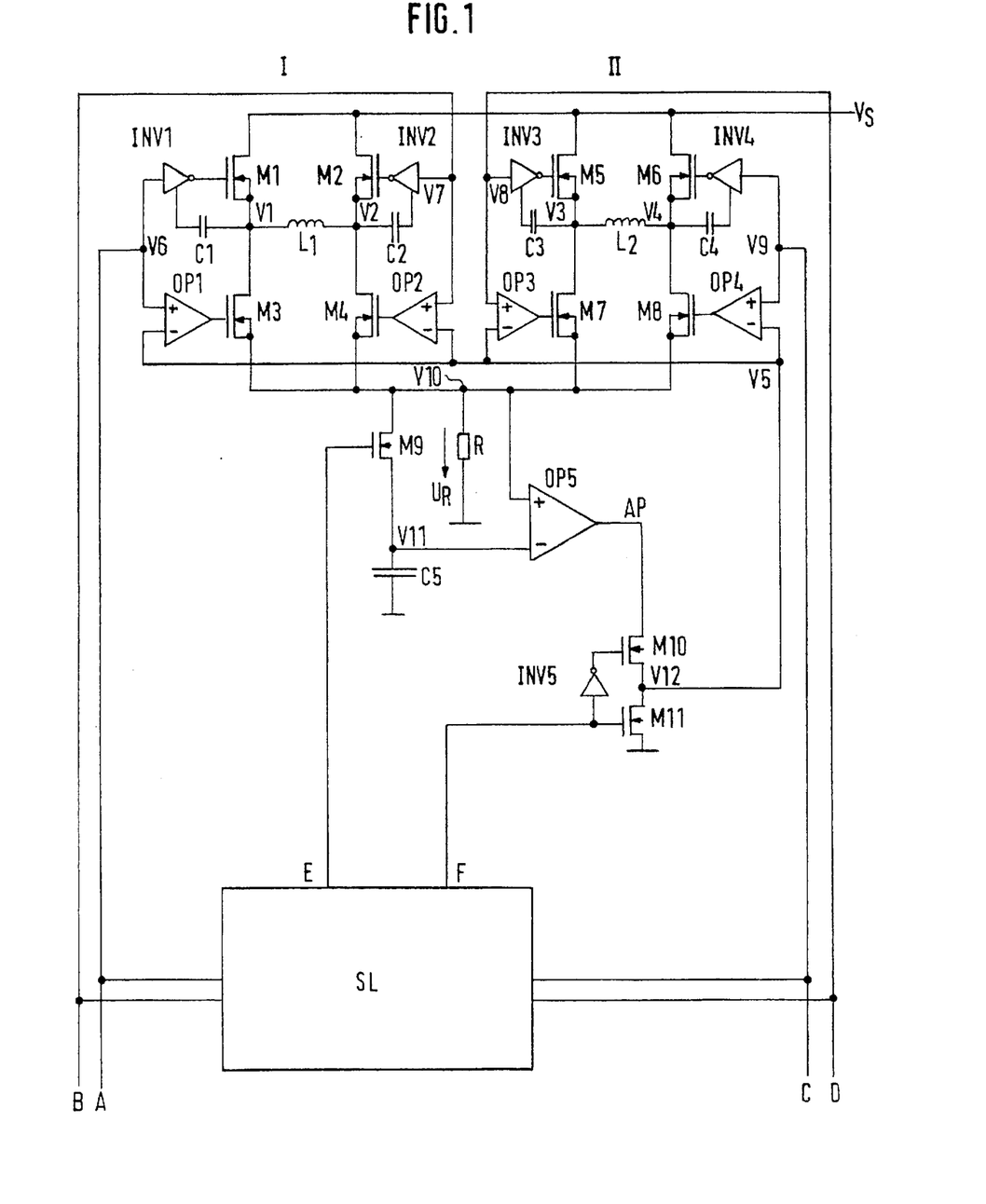
FIG. 1 shows a circuit diagram of an inventive embodiment of a driver circuit for a two-phase stepping motor.

FIG. 1 shows an inventive driver circuit with two full bridges I and II which each drive the current through one of two motor windings L1, L2 of a two-phase stepping motor. Each full bridge has four transistors in known fashion, in the shown embodiment in the form of n-channel MOS transistors M1 to M8. Each of full bridges I and II is constructed by parallel connection of two series connections each with transistor M1, M2, M5, M6 pointing to voltage supply line Vs and with transistor M3, M4, M7, M8 pointing to ground. For the further description of this embodiment the transistors pointing to voltage supply line Vs will be called "upper transistors" and the transistors pointing to ground "lower transistors". The upper and lower transistors of each series connection are interconnected at connection point V1, V2, V3, V4. Motor winding L1 is connected between the two connection points V1 and V2 of full bridge I. Motor winding L2 is connected between connection points V3 and V4 of full bridge II. All four series connections are connected at one end jointly with voltage supply line Vs and at the other end via sensor resistor R with ground.

The gates of upper transistors M1, M2, M5 and M6 are connected to the outputs of inverters INV1, INV2, INV3, INV4, respectively. The gates of lower transistors M3, M4, M7 and M8 are connected to the outputs of operational amplifiers OP1, OP2, OP3, OP4 acting as difference amplifiers. Inverting inputs of operational amplifiers OP1 to OP4 are joined at connection point V5. The noninverting input of each of operational amplifiers OP1, OP2, OP3 and OP4 is connected at corresponding connection point V6, V7, V8, V9 with the input of the corresponding one of inverters INV1, INV2, INV3, INV4. "Corresponding" means in this case that an operational amplifier and an inverter of the same series connection comprising an upper transistor and lower transistor are associated.

Control logic circuit SL has four outputs at which logic signals A, B, C and D are available for driving the driver circuit into the desired half-step mode or full-step mode. Logic signal A is fed to connection point V6 and controls series connection M1, M3 of full bridge circuit I. Logic signal B is fed to connection point V7 and controls series connection M2, M4 of full bridge circuit I. Logic signals C and D are fed to connection points V9 and V8, respectively, and control series connection M6, M8 and series connection M5, M7 of full bridge circuit II.

Capacitors C1, C2, C3, C4 are connected between connection points V1, V2, V3, V4 and corresponding inverters INV1, INV2, INV3, INV4 for the purpose of edge steepness reduction.

A series connection comprising switching transistor M9 and further capacitor C5 is connected in parallel with sensor resistor R. C5 serves as a storage capacitor and M9 forms a storage switch. Connection point V10, at which sensor resistor R is connected with all lower transistors M3, M4, M7, M8, is connected with a noninverting input of further operational amplifier OP5 working as a difference amplifier. Its inverting input is connected with connection point V11 between switching transistor M9 and storage capacitor C5. The output of operational amplifier OP5 is connected to ground via a series connection comprising two further switching transistors M10 and M11. Connection point V12 between switching transistors M10 and M11 is connected with connection point V5. Control logic circuit SL has two further control outputs E and F. Control output E is connected with the gate of switching transistor M9. Control output F is connected with the gate of switching transistor M11 directly and with the gate of switching transistor M10 via further inverter INV5.

All upper transistors M1, M2, M5 and M6 are operated as switches which are switched by control logic circuit SL via inverters INV1, INV2, INV3 and INV4. All lower transistors M3, M4, M7 and M8 are operated as controlled components, the control being effected via operational amplifiers OP1, OP2, OP3 and OP4 under the influence of control logic circuit SL and, depending on the switching state of switching transistors M10 and M11, by the output signal of operational amplifier OP5.

Switching transistors M9 and M11 are normally conductive and switching transistor M10 normally nonconductive. If switching transistors M9 and M11 are conductive, storage capacitor C5 is charged to the voltage drop across sensor resistor R and the inverting inputs of operational amplifiers OP1 to OP4 are practically grounded via conductive switching transistor M11. The output signal of operational amplifier OP5 is rendered nonconductive via M10.

By cutting off M9 one can store the voltage level to which C5 is charged.

If M10 is rendered conductive and M11 nonconductive, the output signal of OP5 is present at the inverting inputs of OP1 to OP4. If M9 is simultaneously nonconductive, OP5 compares the voltage drop across sensor resistor R as the actual value with the voltage level stored in storage capacitor C5 as the set point. The potentials at the inverting inputs of OP1 to OP4 depend on the output signal of OP5 and thus on this comparison between set point and actual value. While M10 is conductive, the operating state of lower transistors M3, M4, M7 and M8 is thus determined not only by logic signals A to D but also by the result of the set point-actual value comparison performed with OP5.

Operational amplifiers OP1 to OP4 preferably have a slight amplification, e.g. of about 3, to avoid harmful offset errors. Furthermore it is of advantage to select operational amplifiers OP1 to OP4 and transistors M1 to M8 in full bridges I and II in pairs with identical behavior if possible.

Figure 4:
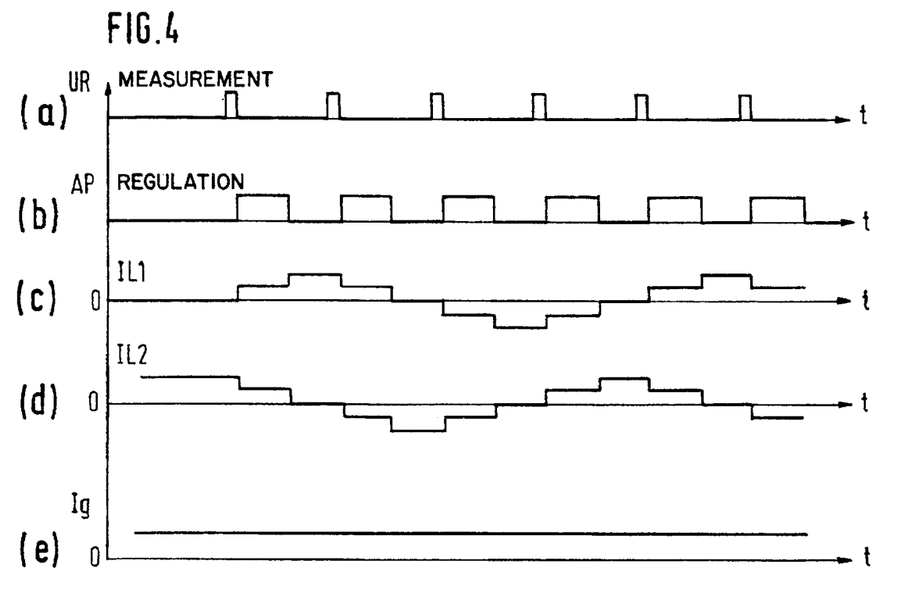
FIG. 4 shows a half-step mode using an inventive driver circuit, FIG. 4(a) showing measured values of the total winding current, FIG. 4(b) the total current consumption of the driver circuit during regulating phases, FIGS. 4(c) and (d) the resulting winding currents through the two motor windings of the two-phase stepping motor, and FIG. 4(e) the total current consumption of the driver circuit.

The function of the driver circuit shown in FIG. 1 will now be explained more closely, first for half-step mode with the aid of FIG. 4 and then for full-step mode with the aid of FIG. 5.

Full bridge driver circuits of the conventional type which are not provided with regulator circuit OP1 to OP5, R, C5 are known to work in such a way that during the time when winding L1 and/or L2 is to be energized a diagonal current is produced in the corresponding full bridge by rendering an upper transistor on one side of the motor winding in question and a lower transistor on the other side simultaneously conductive and the other two transistors nonconductive. If motor winding L1 is to be energized for example, either transistors M1 and M4 or transistors M2 and M3 are rendered conductive simultaneously, depending on the desired current direction. For this purpose one conventionally operates all four transistors of a full bridge strictly as switches which are either in the off state or in the fully on state.

Deviating from conventional driver circuits, lower transistors M3, M4, M7 and M8 are operated in the inventive driver circuit as analog-controllable elements, called amplifier elements here, which are driven via operational amplifiers OP1 to OP4 either into an amplifier mode or into a switch mode depending on the switching state of M10 and M11.

When the driver circuit of FIG. 1 is operated in half-step mode, motor windings L1 and L2 are operated with bipolar current pulses IL1 and IL2 whose phase positions match the control sequences operated in FIGS. 2(a) and (b) but which have no constant height during the particular energizing but rather the stepped forms shown in FIGS. 4(c) and (d). While only one of current windings L1 and L2 is energized the full bridge in charge provides maximum current. While both windings L1 and L2 are energized they are each traversed by a current whose value should be half as great as the current previously traversing only one motor winding. As the path of total current Ig shown in FIG. 4(e) shows, the total current consumption of the driver circuit is constant in this case.

This is attained as follows. During the time when only one of motor windings L1 and L2 is traversed by current, this current is measured with the help of sensor resistor R. At the moment when the other motor winding is additionally energized, the preceding measuring result is stored. With the help of the stored value as a set point the total current is subsequently regulated by the driver circuit to the previously stored value. As a result the total current through the circuit during energizing of two motor windings is just as great as the total current through the driver circuit during energizing of only one motor winding, so that the total current consumption of the driver circuit remains constant according to FIG. 4(e).

This current regulation remains active as long as both motor windings L1 and L2 are energized.

This operating sequence in time is obtained by the driver circuit of FIG. 1 as follows.

During energizing of only one of motor windings L1 and L2 switching transistors M9 and M11 are rendered conductive while switching transistor M10 is cut off. Storage capacitor C5 is charged to a voltage which corresponds to the voltage drop across the sensor resistor and thus the total current through the driver circuit. Due to the cutoff of M10 the current regulation with the help of operational amplifiers OP1 to OP5 is interrupted. Since M11 is conductive the inverting inputs of OP1 to OP4 are practically grounded. The one of lower transistors M3, M4, M7 and M8 which permits the current through conductive motor winding L1 or L2 is thus in its fully on state. At the time when control logic circuit SL provides logic signals A to D to the driver circuit such that the other motor winding is energized in addition to the already energized motor winding, control logic circuit SL releases control signals via its outputs E and F so as to render M9 and M11 nonconductive and M10 conductive. This leads, on one hand, to storage of the voltage level to which storage capacitor C5 is charged at this time. This leads, on the other hand, to the inverting inputs of OP1 to OP4 being no longer practically grounded but practically at the output potential of OP5. This output potential depends on the deviation of the voltage drop now across sensor resistor R (actual value) from the voltage stored in C5 (set point). If the actual value is higher than the set point an accordingly high potential arises at the output of OP5 so that the difference voltage between the two inputs of each of operational amplifiers OP1 to OP4 is accordingly low, assuming that the HIGH potentials of logic signals A to D are identical, so that lower transistors M3, M4, M7 and M8 are driven to weaker conduction. This leads in turn to a reduction of the total current through the driver circuit until there is a voltage drop across sensor resistor R which matches the value stored in C5.

If the actual value is lower than the set point, an accordingly lower potential arises at the output of OP5. This results in an accordingly higher difference voltage and an accordingly higher output voltage of operational amplifiers OP1 to OP4. Lower transistors M3, M4, M7 and M8 are driven to be accordingly more conductive. The total current through the driver circuit and accordingly the voltage drop across sensor resistor R thus rise until the actual value corresponds to the set point.

Due to the activation of control loops OP5, OP1; OP5, OP2; OP5, OP3 and OP5, OP4 the current through each of full bridges I and II is regulated during the regulating phase to half the current which previously flowed through sole motor winding L1 or L2 energized. The total current through both full bridges I and II therefore remains constant. This eliminates the ripple of the current consumed by the driver circuit via the voltage supply circuits. The voltage supply lines therefore have no more high-frequency electromagnetic interference. The phases of current measurement and current regulation are shown in FIGS. 4(a) and (b). In FIG. 4(a) it is assumed that current measurement is done by charging storage capacitor C5 to voltage drop $U_R$ across sensor resistor R only during a short time at the end of energizing only one of the motor windings, by rendering M9 conductive for an accordingly short time. However this current measurement can also take place over a longer period, for example during the entire time when only one motor winding is energized.

According to FIG. 4(b) the regulating phases last as long as both motor windings are energized. FIG. 4(b) shows output potential AP of OP5. Depending on the deviation between actual value and set point during the regulating phase the height of this output potential changes during the regulating mode.

In half-step mode no edge steepness reduction or edge slanting of the energizing pulses is needed to avoid interference. No interference occurs on the voltage supply lines because of the inventive regulation. Interference over the motor leads can be avoided by making the latter very short. Nevertheless, edge steepness reduction can be advantageous to avoid overshoots which could be caused by steep pulse edges.

Figure 5:
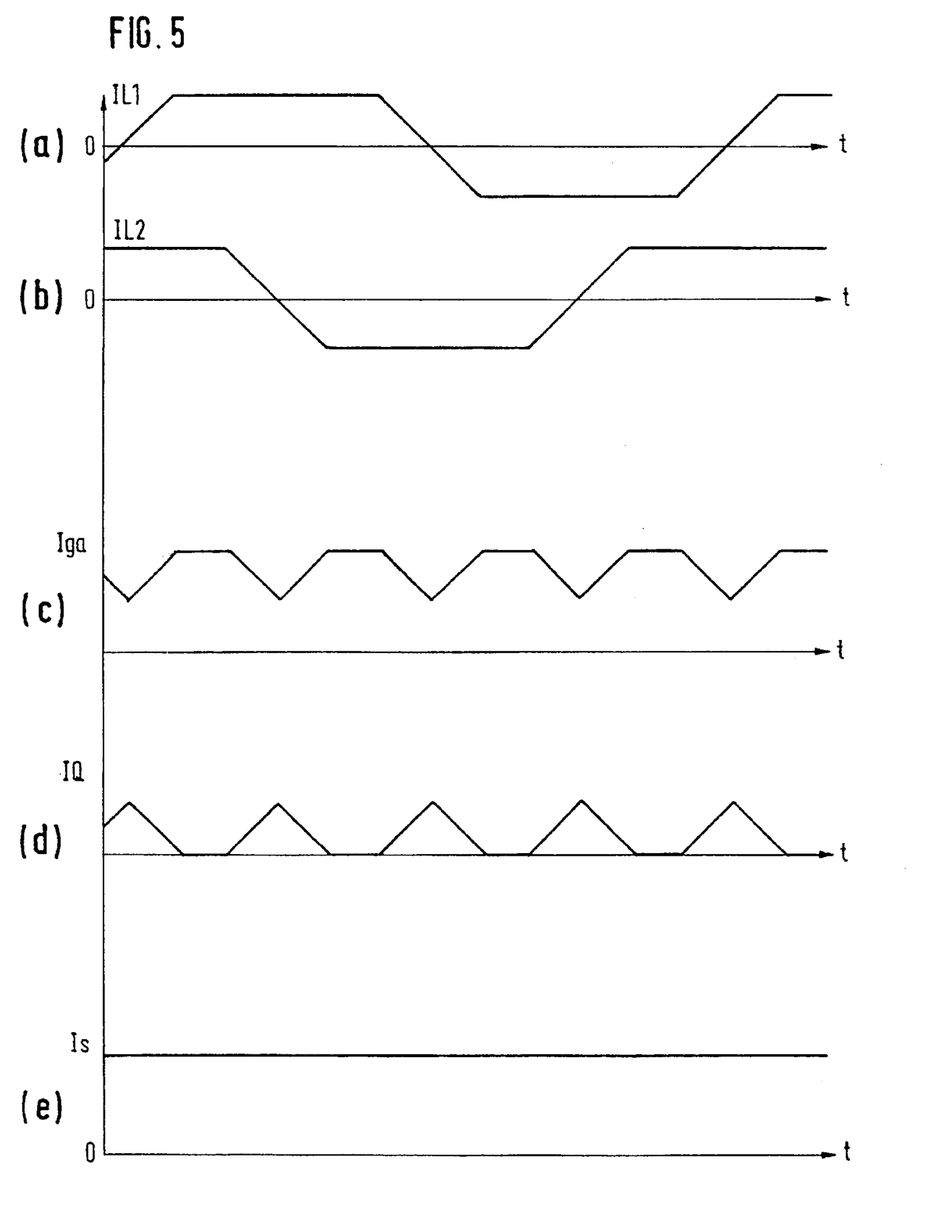
FIG. 5 shows current paths using the inventive driver circuit for full-step mode, FIGS. 5(a) and (b) showing the path of the currents through the two windings of the two-phase stepping motor, FIG. 5(c) the total current consumption of the driver circuit without regulation, FIG. 5(d) the additional current consumption produced by the current regulation, and FIG. 5(e) the total current consumption of the inventive driver circuit in full-step mode.

With reference to FIG. 5 the mode of operation of the driver circuit of FIG. 1 will now be considered in full-step mode.

In conventional full-step mode with known driver circuits the two motor windings L1 and L2 are each supplied with bipolar current pulses. This is done in antiphase for motor windings L1 and L2 such that the switching on and off of one of the motor windings always happens exactly at the times when the other motor winding is switched off or on. If one could assume ideal current pulses, this would result in a constant total current consumption of the driver circuit. No interference over the voltage supply lines would then exist.

Since the pulsed currents traverse motor windings, i.e. inductive components, there are switch-off peaks in the winding currents at the switch-off times, i.e. the trailing pulse edges. These switch-off peaks appear on the supply voltage lines and lead to corresponding interference.

On the one hand the inventive driver circuit produces current pulses in motor windings L1 and L2 which have reduced edge steepness at the times of polarity reversal. On the other hand the current pulses through motor windings L1 and L2 are phase-shifted by 90°. Both things are shown in FIGS. 5(a) and (b), which show currents IL1 and IL2 through L1 and L2.

The phase relation between winding currents IL1 and IL2 is given by logic signals A to D of control logic circuit SL.

The edge steepness reduction can be either already present on logic signals A to D, or caused by edge steepness reducing capacitors C1 to C4. It is also possible to use both measures in combination.

FIG. 5(c) shows total current consumption Iga of the driver circuit without regulation with operational amplifiers OP1 to OP5. During the phases when both motor windings L1 and L2 are maximally energized, the total current has twice the value of the current through each of motor windings L1 and L2. During each polarity reversal with reduced edge steepness there is a temporary V-shaped break in the total current consumption. Such a total current path would lead to a corresponding ripple on the voltage supply lines and thus to interference over the voltage supply lines.

In the inventive driver circuit the regulator circuit with operational amplifiers OP1 to OP5 is activated during the polarity reversal with reduced edge steepness in one or the other of motor windings L1, L2. The result of this regulation is that during the polarity reversals with reduced edge steepness, i.e. during the current breaks which would occur in total current consumption Iga without regulation, idle currents occur through the series connections of the one of full bridges I and II which supplies the one of motor windings L1 and L2 in which the particular polarity reversal with reduced edge steepness is occurring. The regulated idle currents, shown in FIG. 5(d) and designated as IQ, have approximately the shape of an inverted V and have a path and height so as to compensate the current breaks in FIG. 5(c), filling in smoothly the V-shaped current gaps there, so to speak. The result is a constant total current consumption of the driver circuit, as shown in FIG. 5(e) and designated as Is.

Regulation is effected in full-step mode by measuring the total current through both motor windings L1 and L2 during the phases when both motor windings L1 and L2 are energized fully or maximally. At the onset of a subsequent polarity reversal with reduced edge steepness in one of motor windings L1, L2 the previously measured total current value is stored. During the entire phase of the particular polarity reversal with reduced edge steepness the total current through the driver circuit is then compared as the actual value with the previously stored measured value as the set point. The result of this comparison is used for regulating the idle currents compensating the current breaks.

This is obtained with the driver circuit shown in FIG. 1 as follows.

Via output E of control logic circuit SL, M9 is rendered conductive for at least part of the particular phase duration when both motor windings L1, L2 are fully energized in order to represent in storage capacitor C5 the voltage drop across sensor resistor R corresponding to the total current. For the entire duration of the phase of full energizing of both motor windings L1 and L2, M10 is rendered nonconductive and M11 conductive so that no regulation can occur. As soon as a polarity reversal with reduced edge steepness begins in one of motor windings L1 and L2, M9 and M11 are rendered nonconductive and M10 conductive. This activates the regulation, with the preceding measured value now stored in C5 as the set point and the voltage drop now occurring across sensor resistor R changing in accordance with the polarity reversal edge as the actual value.

During the regulating phase transistors of full bridges I and II which would not be conductive at the instantaneous polarity of the winding currents flowing through the full bridges without regulation, are driven by the regulation into an on state such that idle currents flow through the corresponding series connections of full bridges I and II such that there is a constant total current consumption of the driver circuit according to FIG. 5(e). That is to say, the full bridge driven into a polarity reversal draws so much idle current, during the time when the reversed winding does not receive the full current, that the total current consumption of the driver circuit remains constant.

It is thus again the case that the ripple of the total current of the driver circuit disappears and the voltage supply lines no longer have high-frequency electromagnetic interference.

The inventive method for stabilizing the ripple of the total current consumption is also suitable for electric motors with a larger number of windings, for example electronically commutated rotary current motors. Measurement of the current value to be stored is always done during phases in which a total current value is repeated identically or essentially identically. Regulation is performed during phases in which the total current deviates from the total current occurring during the measuring phases. While various embodiments have been described in this application for illustrative purposes, the claims are not so limited. Rather, any equivalent method or device operating according to principles of the invention falls within the scope thereof.

I claim:

1. A driver circuit for an electronically commutated electric motor, in particular stepping motor, having a plurality of motor windings the driver circuit comprising:

a plurality of full bridge circuits each being interconnected between two terminals of a power supply source and each including two series connections connected in parallel with each other, each series connection including two series connected controllable driver elements and defining a connection point therebetween, the two connection points of each full bridge circuit for connecting one of said motor windings therebetween;

one of the two driver elements in each series connection being operated as a controllable switch and the other driver element as a controllable amplifier element;

a control logic circuit having control signal outputs coupled to control inputs of said controllable driver elements and controlling the full bridge circuits to supply winding current pulses to said motor windings;

the total current flowing through the driver circuit having first and second phases;

a current sensor device coupled to the plurality of full bridge circuits to sense a value of total current flowing through the driver circuit;

a sample-and-hold circuit coupled to the current sensing device to sample the sensed value of total current during the first phase and to store the sampled value of total current; and a regulator circuit regulating during the second phase via the controllable amplifier elements the sensed value of total current to the stored sampled value of total current.

2. The driver circuit of claim 1, wherein the electric motor is a two-phase stepping motor having two motor windings and the driver circuit includes two full bridge circuits, the driver elements being driven by the control logic circuit to release winding current pulses for a half-step mode of the stepping motor alternatingly energizing only one motor winding, only the other motor winding or both motor windings, wherein the sample-and-hold circuit samples a value of total current during energizing of only one of the motor windings, and the regulator circuit is in a regulating state only during energizing of both motor windings and then regulates the total current flowing through the driver circuit via the controllable amplifier elements to the value of the total current sampled during preceding energizing of only one of the motor windings.

3. The driver circuit of claim 1, further comprising:
an edge steepness reducing circuit for slanting pulse edges of current pulses fed to the motor windings to a predetermined edge slope.

4. The driver circuit of claim 1, wherein the electric motor is a two-phase stepping motor having two motor windings and the driver circuit includes two full bridge circuits, the driver elements being driven by the control logic circuit to release winding current pulses for a full-step mode of the stepping motor, wherein
an edge steepness reducing circuit is provided for slanting pulse edges of current pulses fed to the motor windings to a predetermined edge slope,
the control logic circuit drives the control inputs of the individual driver elements such that polarity reversals of the current pulses of one motor winding are phase-shifted by 90° over polarity reversals of current pulses of the other motor winding,
the sample-and-hold circuit samples total current value sensed by the current sensor device during maximum energizing of both motor windings,
and the regulator circuit is in a regulating state only during occurrence and duration of an edge slope of one of two winding current pulses and then regulates the total current flowing through the driver circuit via the controllable amplifier elements to the value of the total current value sampled at the preceding maximum energizing of both motor windings.

5. The driver circuit of claim 1 wherein the current sensor device is formed by a current sensor resistor connected at one end to ground and at the other end to the parallel connections of the two full bridge circuits.

6. The driver circuit of claim 1 wherein:
the sample-and-hold circuit samples total current sensed by the current sensor device and includes a controllable storage switch and a storage capacitor,
the sensed current is stored in the storage capacitor when the storage switch is rendered conductive, and the storage switch is rendered nonconductive to separate the storage capacitor from the current sensor device during a regulating state of the regulator circuit.

7. The driver circuit of claim 6 wherein the sample-and-hold circuit is connected in parallel with the current sensor resistor.

8. The driver circuit of claim 1 wherein the regulator circuit has a first difference circuit whose one input receives the sensed value sensed by the current sensor device as the actual value, whose other input receives the sampled value stored in the storage device as the set point, and whose output drives the controllable amplifier elements such that the total current flowing through the driver circuit as sensed by the current sensor device is regulated to the stored sampled value.

9. The driver circuit of claim 8 wherein an idle current flows through at least one of the series connections of the plurality of full bridge circuits such that the total current flowing through the driver circuit is regulated to the stored sampled value.

10. The driver circuit of claim 8 wherein:
between the output of the first difference circuit and the pole of the voltage supply source to which the ends of the plurality of full bridge circuits having the controllable amplifier elements point, a series connection with a first regulator circuit switch pointing to the output of the first difference circuit and a second regulator circuit switch pointing to said pole of the voltage supply source is connected,
the regulator circuit has second to fifth difference circuits,
of each of the second to fifth difference circuits a first input is coupled with an associated control signal output of the control logic circuit, a second input with a connection point between first and second regulator circuit switches and an output with a control input of one of the controllable amplifier elements,
and the first and second regulator circuit switches are drivable to be conductive and nonconductive opposingly by means of a switch control signal from the control logic circuit such that the second regulator circuit switch is rendered conductive or nonconductive synchronously with the storage switch, and the first regulator circuit switch opposingly to the storage switch.

11. The driver circuit of claim 10 wherein each control signal output of the control logic circuit is associated to one of the series connections of one Of the full bridge circuits, and each control signal output is commonly connected to said first input of an associated one of the second to fifth difference circuits and, via an inverter circuit, to the control input of the controllable switch of the associated series connection of the one of the full bridge circuits.

12. The driver circuit of claim 11 wherein each of the inverter circuits is provided with an edge steepness reducing capacitor.

13. The driver circuit of claim 1 wherein all controllable switches and all controllable amplifier elements are formed by MOS transistors.

14. The driver circuit of claim 1 wherein all difference circuits have difference amplifiers in the form of operational amplifiers.

15. The driver circuit of claim 2, further comprising:
an edge steepness reducing circuit for slanting pulse edges of current pulses fed to the motor windings to a predetermined edge slope.

16. The driver circuit of claim 2 wherein the current sensor device is formed by a current sensor resistor which is connected at one end with one of two poles of said voltage supply source and at the other end with the parallel connections of the two full bridge circuits.

17. The driver circuit of claim 4 wherein the current sensor device is formed by a current sensor resistor which is connected between ground and the two full bridge circuits.

18. A driver circuit for an electronically commutated electric motor having windings comprising:
a plurality of bridge circuits supplying current to said windings;
a sensing device coupled to said plurality of bridge circuits to sense a value of total current flowing through said plurality of bridge circuits;
a storage device coupled to said sensing device and operable to store the sensed value when the total value of winding current is substantially constant; and
a regulator circuit coupled to said sensing device, said storage device, and said plurality of bridge circuits, said regulator circuit regulating total current as sensed by the sensing device toward the stored sensed value when the value of total current sensed by the sensing device deviates from the stored sensed value.

19. The driver circuit of claim 18 wherein each of said bridge circuits further comprises:
a pair of driver sections, the motor winding being electrically connected between said driver sections.

20. The driver circuit of claim 19 wherein each of said driver sections comprises first and second driver elements electrically connected in series, said first driver element being a controllable switch, said second driver element being a controllable amplifier element.

21. The driver circuit of claim 20 wherein said first and second driver elements comprise MOS transistors.

22. The driver circuit of claim 18, further comprising:
an edge steepness reducing circuit for slanting pulse edges of current pulses supplied to the motor windings to a predetermined edge slope, said edge steepness reducing circuit being coupled to the windings and to said regulator circuit.

23. The driver circuit of claim 22 wherein said edge steepness reducing circuit comprises a plurality of capacitors.

24. The driver circuit of claim 20 wherein said regulator circuit comprises:
a first difference amplifier having a first input coupled to said sensing device and a second input coupled to said storage device, said difference circuit having an output coupled to said plurality of bridge circuits.

25. The driver circuit of claim 24 wherein said regulator circuit further comprises:
a plurality of second difference amplifiers having inputs coupled to the output of said first difference amplifier, said second difference amplifiers each having an output coupled to a control terminal of a respective second driver element.

26. The driver circuit of claim 18 wherein said sensing device comprises a current sensor resistor.

27. The driver circuit of claim 18 wherein said storage device comprises:
a capacitor electrically connectable to said sensing device; and
a switching device electrically connected in series with said capacitor, said switching device switching responsive to a control signal from said regulator circuit, such that said switching device electrically disconnects said capacitor from said sensing device when said regulator circuit regulates total current flowing through said plurality of bridge circuits.

28. A method of regulating current supplied to windings of an electronically commutated motor through a plurality of bridge circuits, the method comprising the steps of:
supplying current to a plurality of motor windings through the bridge circuits;
continuously sensing a value of total current flowing through the bridge circuits;
storing the sensed value when the total value of the winding current is substantially constant; and
regulating total current flowing through the bridge circuits toward the stored sensed value when a sensed value of total current deviates from the stored sensed value.

29. The method of claim 28 wherein said storing step comprises the steps of:
sampling the sensed value of total current; and
storing the sampled value in a capacitor.

30. The method of claim 28 wherein said storing step stops during said regulating step.

31. The method of claim 28 wherein said storing step comprises the steps of:
electrically connecting a storage device in parallel with a current sensing device; and
electrically disconnecting the storage device during said regulating step.

32. The method of claim 28 wherein said supplying step comprises the step of:
slanting edges of current pulses fed to the motor windings to a predetermined edge slope.

33. The method of claim 28 wherein said regulating step comprises the steps of:
comparing the sensed value with the stored sensed value;
driving controllable amplifier elements with a control signal having a first level when the sensed value equals the stored sensed value;
driving the controllable amplifier elements with a control signal having a level less than the first level when the sensed value is greater than the stored sensed value; and
driving the controllable amplifier elements with a control signal having a level greater than the first level when the sensed value is less than the stored sensed value.

34. A driver circuit for an electronically commutated electric motor having windings, the driver circuit comprising:
a plurality of bridge circuits supplying current to the windings;
a sensor coupled to the plurality of bridge circuits and operable to sense a value of total current flowing through the plurality of bridge circuits, the total current flowing through the plurality of bridge circuits having first and second phases;
a storage device coupled to the sensor and operable to store the sensed value during the first phase; and
a regulator circuit coupled to the sensor, the storage device and the plurality of bridge circuits, the regulator circuit regulating the total current as sensed by the sensor toward a stored sensed value during the second phase when the sensed value deviates from the stored sensed value.

35. The driver circuit of claim 34 wherein each bridge circuit comprises:
a pair of driver sections with each driver section including first and second driver elements coupled in series with each other, the first driver element being a controllable switch and the second driver element being a controllable amplifier element having an input coupled to an output of the regulator circuit.

36. A method of regulating current flowing through a plurality of bridge circuits that drive a plurality of windings of an electronically commutated motor, the method comprising the steps of:
supplying current to the motor windings through the bridge circuits;
continuously sensing a value of total current flowing through the bridge circuits, the total current flowing through the bridge circuits having first and second phases;
storing the sensed value during the first phase; and
regulating the total current as sensed by the sensing step toward the stored sensed value during the second phase such that the total current flowing through the bridge circuits during the first and second phases are substantially equal.

* * * * *